United States Patent
Hirose

(10) Patent No.: US 9,305,158 B2
(45) Date of Patent: *Apr. 5, 2016

(54) AUTHENTICATION BY IMAGE MANIPULATION

(71) Applicant: EMPIRE TECHNOLOGY DEVELOPMENT LLC, Wilmington, DE (US)

(72) Inventor: Haruto Hirose, Yokohama (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/510,027

(22) Filed: Oct. 8, 2014

(65) Prior Publication Data

US 2015/0026788 A1 Jan. 22, 2015

Related U.S. Application Data

(63) Continuation of application No. 13/522,932, filed as application No. PCT/US2012/029422 on Mar. 16, 2012, now Pat. No. 8,887,255.

(51) Int. Cl.
| | |
|---|---|
| *G06F 7/04* | (2006.01) |
| *G06F 21/44* | (2013.01) |
| *G06F 21/36* | (2013.01) |
| *H04L 29/06* | (2006.01) |
| *H04W 12/06* | (2009.01) |
| *G06F 21/31* | (2013.01) |

(52) U.S. Cl.
CPC .............. *G06F 21/44* (2013.01); *G06F 21/36* (2013.01); *G06F 21/445* (2013.01); *H04L 63/0884* (2013.01); *H04W 12/06* (2013.01); *G06F 21/31* (2013.01); *G06F 2221/2113* (2013.01)

(58) Field of Classification Search
CPC ........ G06F 21/44; G06F 21/36; H04W 12/06; H04L 63/0884
USPC ............................................................ 726/7
See application file for complete search history.

(56) References Cited

U.S. PATENT DOCUMENTS

| | | | | |
|---|---|---|---|---|
| 7,716,747 | B2 * | 5/2010 | Wakao ................... | H04L 9/3242 713/189 |
| 8,405,729 | B2 * | 3/2013 | Jain ........................ | H04L 63/18 348/207.1 |
| 8,428,365 | B2 | 4/2013 | Tanaka | |
| 2003/0065922 | A1 * | 4/2003 | Fredlund ............. | H04L 63/0823 713/176 |
| 2003/0159040 | A1 | 8/2003 | Hashimoto et al. | |
| 2004/0015566 | A1 | 1/2004 | Anderson et al. | |

(Continued)

OTHER PUBLICATIONS

International Search Report dated Jun. 13, 2012 as received in application No. PCT/US2012/029422.

(Continued)

*Primary Examiner* — Mohammad W Reza
(74) *Attorney, Agent, or Firm* — Maschoff Brennan

(57) ABSTRACT

In some examples, a method of authenticating is described. The method may include sending first repair parameters representing one or more first repair operations applied to a first marked image to generate a first repaired image to a first entity. The method may also include receiving, from the first entity, a second repaired image. The method may also include authenticating the first entity when the second repaired image received from the first entity matches the first repaired image.

25 Claims, 8 Drawing Sheets

(56) References Cited

U.S. PATENT DOCUMENTS

| | | |
|---|---|---|
| 2006/0215887 A1 | 9/2006 | Nishimura et al. |
| 2008/0072056 A1 | 3/2008 | Turner |
| 2009/0021591 A1 | 1/2009 | Sako |
| 2010/0043062 A1 | 2/2010 | Alexander et al. |
| 2010/0107214 A1 | 4/2010 | Ganz |
| 2010/0186096 A1* | 7/2010 | Wakao .................. H04L 9/3242 726/30 |
| 2011/0087920 A1 | 4/2011 | Hendricks et al. |
| 2011/0216960 A1 | 9/2011 | VanKirk et al. |

OTHER PUBLICATIONS

Written Opinion of the International Searching Authority dated Jun. 13, 2012 as received in application No. PCT/US2012/029422.

Ginesu et al., "Mutual Image-Based Authentication Framework with JPEG2000 in Wireless Environment", EURASIP Journal on Wireless Communications and Networking vol. 2006, Issue 2, pp. 1-14.

Menezes A., et al., Handbook of Applied Cryptography, Chapter. 10, CRC Press (1996).

\* cited by examiner

AUTHENTICATION BY IMAGE MANIPULATION

CROSS-REFERENCE TO RELATED APPLICATIONS

This patent application is a continuation under 35 U.S.C. §120 of U.S. patent application Ser. No. 13/522,932 filed on Jul. 18, 2012, now U.S. Pat. No. 8,887,255, which is the National Stage Entry under 35 U.S.C. §371 of International Application No. PCT/US2012/029422 filed on Mar. 16, 2012. The foregoing applications are incorporated herein by reference.

BACKGROUND

Unless otherwise indicated herein, the materials described herein are not prior art to the claims in the present application and are not admitted to be prior art by inclusion in this section.

Authentication generally refers to the process of establishing an identity of an individual or more generally to a process of establishing a claim that something is true. The type of authentication required in any given situation can vary widely. Many situations may require strict and multi-faceted authentication while other situations have less stringent authentication requirements.

There are various factors that can be used to establish identity or to establish that something is what it claims to be. Common factors used during authentication include ownership, knowledge, and inherency factors. Ownership factors often refer to something that a user possesses, such as a card or a token. Knowledge factors refer to something that is known to the user, such as a password, and inherency factors often relate to something about the user, such as a fingerprint or a retinal pattern.

Password authentication is popular for accessing cloud services and in general for accessing services or content through a communication network. In systems where access privileges are assigned on a per-semantic-unit basis, it may be necessary to enter a password on a per-clause basis. Entering a password on a per-clause basis can be complex and/or tedious for users with touchscreen devices. The complexity and/or tedium may discourage users with touchscreen devices from setting passwords, which may pose a security threat.

SUMMARY

Technologies described herein generally relate to authentication by inpainting, or marking, of images.

In some examples, a method of authenticating is described. The method may include sending first repair parameters representing one or more first repair operations applied to a first marked image to generate a first repaired image to a first entity. The method may also include receiving, from the first entity, a second repaired image. The method may also include authenticating the first entity when the second repaired image received from the first entity matches the first repaired image.

In some examples, a method of preparing image data for authenticating an entity is described. The method may include receiving a marked image from a first computing device. The method may also include applying a sequence of one or more repair operations to the marked image to generate a repaired image. The method may also include sending the repaired image and repair parameters representing the one or more repair operations to a second computing device.

In some examples, a method of authenticating is described. The method may include receiving, at a first entity, repair parameters representing one or more repair operations from a second entity. The method may also include applying the one or more repair operations to a marked image to generate a first repaired image. The method may also include sending the first repaired image to the second entity. The first entity may be authenticated when the second entity determines that the first repaired image matches a second repaired image accessible to the second entity.

In some examples, a device for authenticating is described. The device may include a communication interface configured to send repair parameters representing one or more repair operations applied to a marked image to generate a first repaired image to an entity. The communication interface may also be configured to receive a second repaired image from the entity. The device may also include a matching module configured to authenticate the entity when the second repaired image received from the entity matches the first repaired image.

In some examples, a device for preparing image data for authenticating an entity is described. The device may include a communication interface configured to send a selected image from one or more stored images to a first entity that marks the selected image to create a marked image and to receive the marked image from the first entity. The device may also include a repairing module configured to apply any of a plurality of repair operations to the marked image to generate a repaired image.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
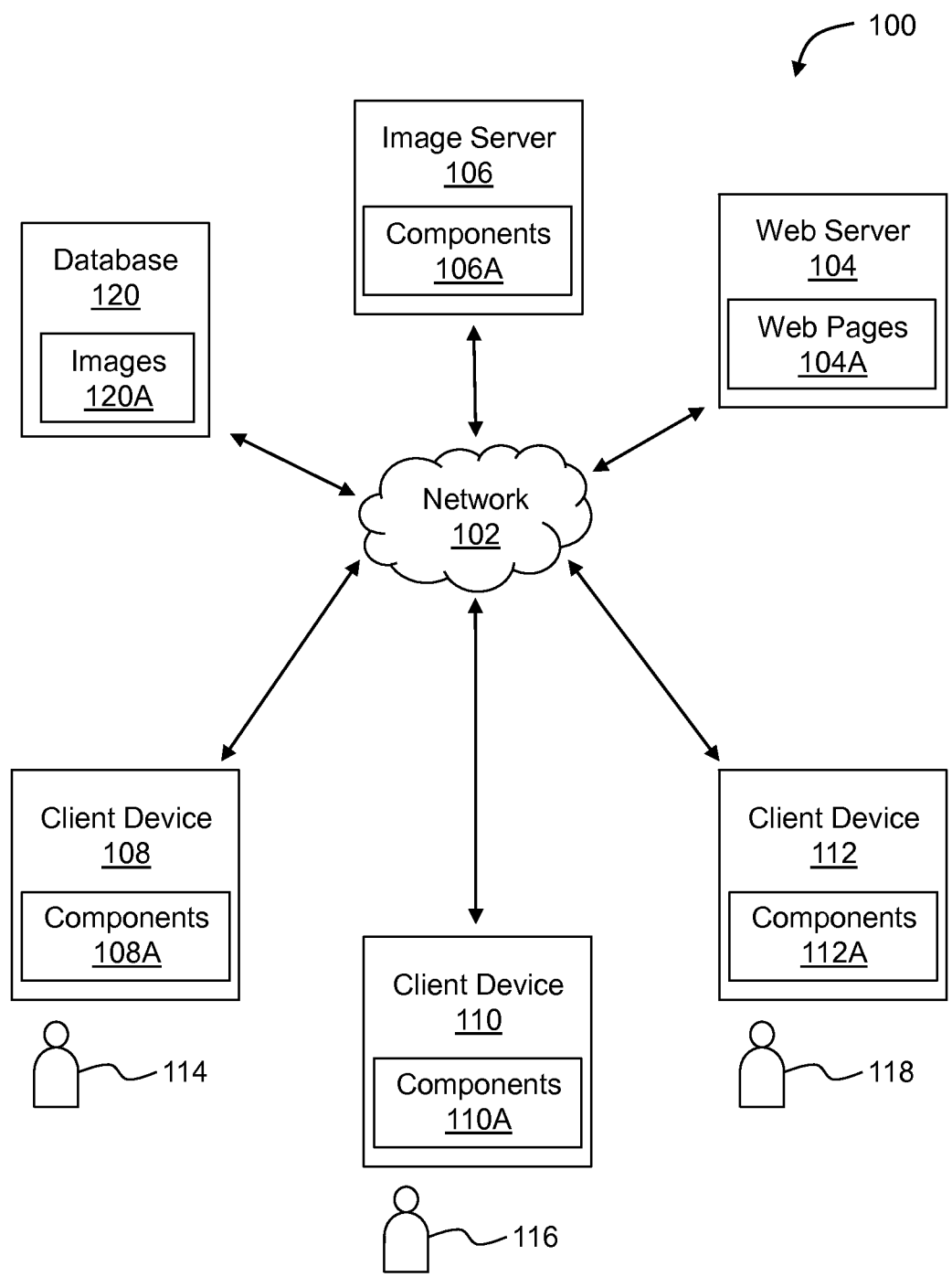
FIG. 1 is a block diagram of an example system for implementing authentication.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Some embodiments described herein implement an authentication system in which an image is marked in advance and one or more repair operations are applied to the marked image to generate corresponding repair parameters and a first repaired image. The marked image may be retained by or provided to a first entity for use in authentication with a second entity, and the repair parameters and the first repaired image may be provided to the second entity.

During authentication, the second entity may provide the repair parameters to the first entity. The first entity may apply the operations represented by the repair parameters to the marked image to generate a second repaired image. The second repaired image may be provided to the second entity and compared by the second entity against the first repaired image. If the first and second repaired images match, the first entity may be authenticated by the second entity.

In some authentication systems, an arbitrary number that is irrelevant to a user is generated as a password for the user to access a corresponding user account. Alternately or additionally, a user may be reluctant to provide personal information often required to register for an account to gain access to services and/or content through a network such as the Internet. However, some embodiments described herein present an image to a user which may be easier for the user to remember than a password and/or may be difficult to perfectly reproduce. Moreover, the image marking can be controlled by the user in some embodiments, allowing the user to adjust the strength of security.

FIG. 1 is a block diagram of an example system 100 for implementing authentication, arranged in accordance with at least some embodiments described herein. The system 100 may include a network 102, a web server 104, an image server 106, and one or more client devices 108, 110, 112.

In general, the network 102 may include one or more wide area networks (WANs) and/or local area networks (LANs) that enable the web server 104, image server 106 and/or client devices 108, 110, 112 to communicate with each other. In some embodiments, the network 102 includes the Internet, including a global internetwork formed by logical and physical connections between multiple WANs and/or LANs. Alternately or additionally, the network 102 may include one or more cellular RF networks and/or one or more wired and/or wireless networks such as, but not limited to, 802.xx networks, Bluetooth access points, wireless access points, IP-based networks, or the like. The network 102 may also include servers that enable one type of network to interface with another type of network.

The web server 104 may be configured to provide access to a website including one or more web pages 104A to the client devices 108, 110, 112, and/or to one or more services provided through the website. More specifically, the web server 104 may be configured to accept Hypertext Transfer Protocol (HTTP) requests and/or HTTP Secure (HTTPS) requests from client devices 108, 110, 112 and/or to serve the client devices 108, 110, 112 HTTP responses or HTTPS responses along with optional data contents, which can include Hypertext Markup Language (HTML) documents such as the web pages 104A and linked objects for display to users 114, 116, 118 associated with the client devices 108, 110, 112. Alternately or additionally, the web server 104 may provide one or more services or access to content to or for the client devices 108, 110, 112. Moreover, the web server 104 can participate in the construction of an authentication system and/or in the authentication of the client devices 108, 110, 112 or the users 114, 116, 118 that participate in building the authentication system.

Each of the client devices 108, 110, 112 may include, by way of example only, components 108A, 110A, 112A. Each of the client devices 108, 110, 112 may also include a processor that is configured to interact with and/or control some or all of the components 108A, 110A, 112A. The client devices 108, 110, 112 are representative of devices that can communicate over the network 102 with the web server 104, the image server 106, and/or each other. Examples of the client devices 108, 110, 112 include, but are not limited to, cellular phones, smartphones, mobile phones, audio and/or video devices, laptop computers, notebook computers, tablet devices, or the like or any combination thereof.

The components 108A, 110A, 112A may include hardware, software, and/or firmware components. The components 108A, 110A, 112A, as described in more detail below, can be used to perform authentication of the client device 108, 110 or 112 or of the user 114, 116 or 118 of the client device 108, 110 or 112, or of the web server 104 or the like or any combination thereof. The components 108A, 110A, 112A often work together in the same client device 108, 110, 112 and/or with the components of another client device and/or the web server 104 to perform authentication. For example, the components 108A or 110A of the client device 108 or 110 may cooperate with the components 112A of the client device 112, with the image server 106 and/or with the web server 104 to build an authentication system and/or to authenticate participants, such as the client device 108, 110, 112 and/or the web server 104, in the authentication system.

The components 108A, 110A, 112A may include, for instance, one or more accelerometers, a global positioning system, one or more cameras, speakers, or the like or any combination thereof. The components 108A, 110A, 112A may also include modular components or mechanisms that are configured to operate to construct an authentication system and/or configured to authenticate a device with the authentication system as described in more detail below.

The image server 106 may also be involved in the authentication process. The image server 106 can participate in the construction of the authentication system and/or in the authentication of the client devices 108, 110, 112 or the users 114, 116, 118 that participated in building the authentication system. The image server 106 may include components 106A to perform at least some of the aspects of the authentication process described herein. The image server 106, and/or the client devices 108, 110, 112, may include or have access to a database 120. The database 120 may store images 120A or other data used during the authentication disclosed herein.

For example, an image from the images 120A, or an image captured at one of the client devices 108, 110, 112 or obtained elsewhere can be marked by one of the users 114, 116, 118. One or more repair operations can be applied to the marked image to generate a first repaired image and corresponding repair parameters. The marked image may be provided to one entity in an authentication process, such as the web server 104, and the first repaired image and repair parameters can be provided to another entity in the authentication process, such as the client device 108. During authentication, the client device 108 may provide the repair parameters to the web server 104. The web server 104 may apply the repair parameters to the marked image to generate a second repaired image that is sent to the client device 108. The client device 108 may compare the second repaired image to the first repaired image and authenticate the web server 104 if the two repaired images match.

Figure 2A:
FIG. 2A is an example of a first login interface for implementing authentication.
Figure 2B:
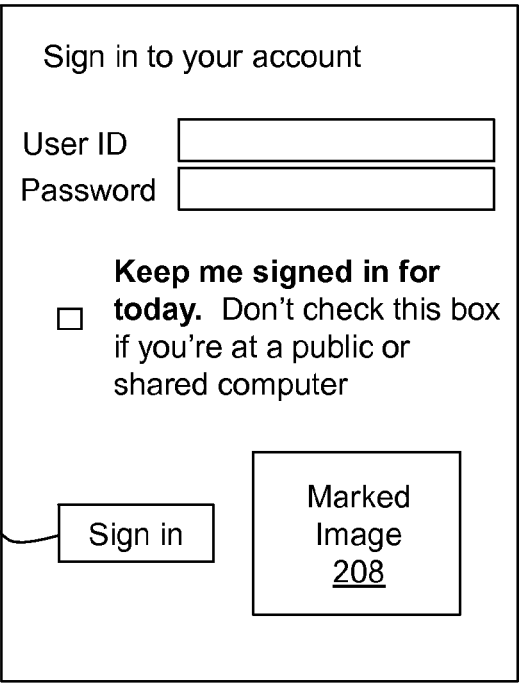
FIG. 2B is an example of a second login interface for implementing authentication.

FIG. 2A is an example of a first login interface 200A for implementing authentication, arranged in accordance with at least some embodiments described herein. FIG. 2B is an example of a second login interface 200B for implementing authentication, arranged in accordance with at least some embodiments described herein. Each of the first and second login interfaces 200A, 200B may permit users 114, 116, 118 to access content or services provided by the web server 104 after authenticating using a user ID and password. Alternately or additionally, the first and second login interfaces 200A, 200B may permit users 114, 116, 118 to access content or services provided by the web server 104 after authenticating by exchanging repair parameters and/or repaired images as described herein. In some embodiments, the second login interface 200B may be displayed to a user in response to selection by the user of the "Sign in" button 202 in the first login interface 200A, with or without having received a user ID and/or password in corresponding fields in the first login interface 200A.

In these and other embodiments, there may be several types of users with varying degrees of access to the content and/or services provided by the web server 104. For instance, uninterested users that are unwilling to obtain a user account or even complete a sign-in operation may briefly browse the first or second login interfaces 200A, 200B without ever signing in and accessing content or services provided by the web server 104.

Users that are unregistered, e.g., users that have not registered for a user account by providing personal information, but are interested in content and/or services provided by the web server 104 (hereinafter "interested users") may sign in by clicking the "Sign in" button 202 in the first login interface 200A and/or a "Sign in" button 204 in the second login interface 200B without having to register for an account. Interested users may be able to access limited content and/or services from the web server 104. Alternately or additionally, interested users may become registered users by selecting a "Register" button 206 in the first login interface 200A.

In some examples that follow, the user 114 of FIG. 1 may be described as an interested user. Moreover, the actions described as being performed by the interested user 114 (or other users 116, 118) may in general be performed by, through, or with assistance of the client device 108 (or the corresponding client device 110, 112) unless context dictates otherwise. In these and other embodiments, the interested user 114 may sign in without being registered by first selecting the "Sign in" button 202 to cause the second login interface 200B to be displayed. The second login interface 200B may include a marked image 208. In response to selecting the "Sign in" button 204, the web server 104 may request repair parameters for the marked image 208. Since the interested user 114 is unregistered, the interested user 114 may lack the repair parameters and the client device 108 may return a message to the web server 104 indicating the lack of repair parameters. Alternately or additionally, the interested user 114 may have repair parameters assigned to unregistered users that are saved in a cookie or elsewhere on the client device 108, which repair parameters are provided to the web server 104. Alternately or additionally, to the extent the interested user 114 has any repair parameters, the interested user 114 may have as many as all of the repair parameters to repair the marked image 208, or some percentage less than 100% of the repair parameters to repair the marked image 208. In these and other embodiments, the level of access granted to the interested user 114 (or other users 116, 118) may depend on the percentage of the repair parameters possessed by the interested user 114. For instance, if the interested user 114 has 20% or 35% or some other percentage of the repair parameters to repair the marked image 208, the interested user 114 may be able to access 20% or 35% or some other percentage of content and/or services from the web server 104.

Based on the message received from the client device 108, whether the message indicates the lack of repair parameters or includes the repair parameters assigned to unregistered users, the web server 104 may determine that the interested user 114 is an unregistered user and may provide the interested user 114 with access to limited content and/or services based on the determination. If the message includes the repair parameters assigned to unregistered users, the web server 104 may also apply one or more repair operations represented by the repair parameters to the marked image 208 to generate a repaired image. The repaired image can be provided to the client device 108 and matched against a locally stored repaired image previously received at the client device 108. If the two repaired images match, the web server 104 may be authenticated by the interested user 114.

Registered users include users that have registered for a user account by, e.g., providing personal information to the web server 104 and creating a user account. Similar to interested users, registered users may, in some embodiments, sign in by clicking the "Sign in" button 202 in the first login interface 200A and/or the "Sign in" button 204 in the second login interface 200B. Registered users may be able to access a greater amount of content and/or services from the web server 104 than interested users.

In some examples that follow, the user 116 of FIG. 1 may be described as a registered user. In these and other embodiments, the registered user 116 may sign in by first selecting the "Sign in" button 202 to cause the second login interface 200B to be displayed. In response to selecting the "Sign in" button 204, the web server 104 may request repair parameters for the marked image 208. The registered user's 116 client device 110 returns the repair parameters to the web server 104. The web server 104 may receive the repair parameters, which may serve to authenticate the registered user 116 such that the web server 104 can provide access to services and/or content to the registered user 116. The web server 104 may also apply one or more repair operations represented by the repair parameters to the marked image 208 to generate a repaired image. The repaired image can be provided to the client device 110 and matched against a locally stored repaired image previously received at the client device 110. If the two repaired images match, the web server 104 may be authenticated by the registered user 116.

The user 118 of FIG. 1 may be described as an administrator, such as a website administrator of a website served by the web server 104. Additional details regarding the administrator 118 are provided below.

Figure 3:
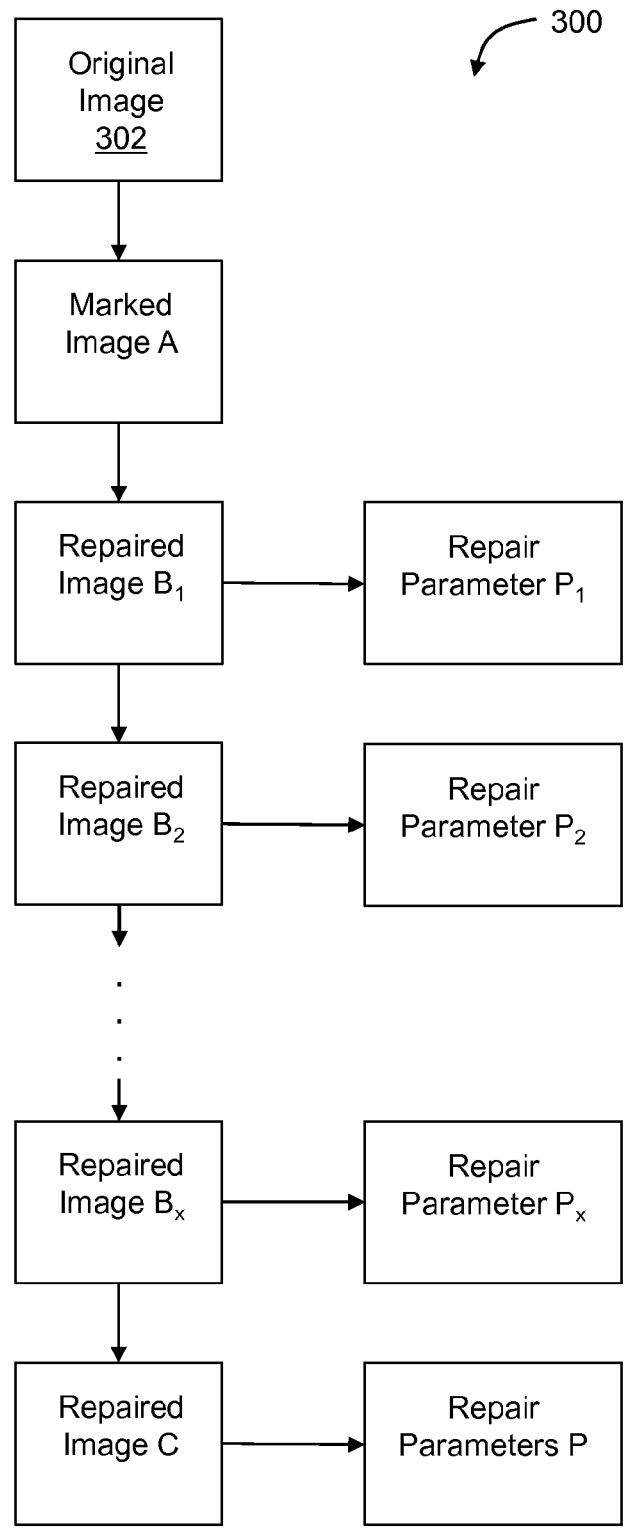
FIG. 3 illustrates multiple number of images and repair parameters generated from an original image during an image preparation process.

FIG. 3 illustrates multiple number of images and repair parameters 300 generated from an original image 302 during an image preparation process, arranged in accordance with at least some embodiments described herein. The images and repair parameters 300 may be used to implement authentication and/or may be generated at any one or more of the web server 104, image server 106 and/or client devices 108, 110, 112 of FIG. 1. The images and repair parameters 300 may include a marked image A, one or more repaired images $B_1$, $B_2, \ldots, B_x$ and associated repair parameters $P_1, P_2, \ldots, P_x$, and a repaired image C and associated repair parameters P.

With combined reference to FIGS. 1 and 3, the original image 302 may be obtained from the database 120 of images 120A of FIG. 1 through the image server 106. Alternately or additionally, the original image 302 may be generated at any one of the client devices 108, 110, 112 by a camera or other image generating component of the client devices 108, 110, 112. Alternately or additionally, the original image 302 may be obtained from any other suitable source.

The marked image A may be generated by marking the original image 302. For instance, the client device 112 may include, in the components 112A, a component that applies marks to an image displayed on the client device 112 in response to inputs received through a user interface of the client device 112. For instance, the original image 302 may be marked with a line in response to the administrator 118 dragging a finger across a touchscreen of the client device 112 on which the original image 302 is displayed. More generally, the specific mark applied to the original image 302 during image marking may correspond to a specific input or inputs provided by a user of a client device.

The repaired image $B_1$ may be generated by applying a repair operation to the marked image A at a first time $t_1$. The repair operation performed to generate the repaired image $B_1$ may be represented by the repair parameter $P_1$ in FIG. 3.

Similarly, the repaired image $B_2$ may be generated by applying another repair operation to the repaired image $B_1$ at a second time $t_2$. The repair operation performed to generate the repaired image $B_2$ may be represented by the repair parameter $P_2$.

Similarly, the repaired image $B_x$ may be generated by applying another repair operation to an immediately preceding repaired image $B_{x-1}$ (not shown) at a time $t_x$. The repair operation performed to generate the repaired image $B_x$ may be represented by the repair parameter $P_x$.

Thus, according to some embodiments, each repaired image $B_1, B_2, \ldots, B_x$ may be generated by applying a repair operation represented by a corresponding repair parameter $P_1, P_2, \ldots, P_x$ at a corresponding time $t_1, t_2, \ldots, t_x$ to a preceding image, including the original image 302, and the repaired images $B_1, \ldots, B_{x-1}$.

The repaired image C may be generated by the successive application of the repair operations represented by the repair parameters $P_1, P_2, \ldots, P_x$ to the original image 302. Alternately or additionally, the repair operations represented by the repair parameters $P_1, P_2, \ldots, P_x$ may be applied to the original image 302 in any order and/or one or more of the repair operations may be omitted to generate the repaired image C. All of the repair parameters representing the repair operations applied to the original image 302 to generate the repaired image C may be collectively represented as the repair parameters P in FIG. 3.

The repair operations represented by the repair parameters P may include, but are not limited to, enlarging an image area by a percentage $n_1$, reducing an image area by a percentage $n_2$, removing a particular color from an image area by a percentage $n_3$, or reducing block noise in an image area by a percentage $n_4$. For instance, a specific example repair parameter corresponding to enlarging an image area by a percentage $n_1$ at time $t_1$ might include: $t_1$=enlarge by 30%: Area (100, 200). As another example, a specific example repair parameter corresponding to removing a particular color from an image area by a percentage $n_3$ at a time $t_2$ might include: $t_2$=remove yellow by 5%: Area (150, 250). As another example, a specific example repair parameter corresponding to reducing block noise by a percentage $n_4$ at time $t_3$ might include $t_3$=reduce block noise by 40%.

Embodiments described herein may alternately or additionally include other repair operations and corresponding repair parameters. For instance, the repair operations represented by the repair parameters P of FIG. 3 may alternately or additionally include one or more of: image thresholding, color temperature conversion, color space conversion, edge enhancement processing, applying a fast Fourier Transform (FFT) filter, applying a Kalman filter, autoregressive (AR) processing, line or line segment detection, curve extraction, or affine transformation.

In operation, the marked image A may be distributed to a first one of the entities of FIG. 1, while the repaired image C and repair parameters P may be distributed to a second one of the entities of FIG. 1. The first entity may authenticate the second entity by receiving the repair parameters P from the second entity. The first entity may apply the repair operations represented by the repair parameters P to the marked image A to generate another repaired image, hereinafter repaired image C' (not shown), which is sent to the second entity. The second entity may authenticate the first entity by comparing the previously received repaired image C to the repaired image C' received from the first entity and determining whether the repaired images C and C' match. If they match, the second entity may authenticate the first entity. For instance, the foregoing process may be used for mutual authentication between the web server 104 and the registered user 114 using the client device 108.

Figure 4A:
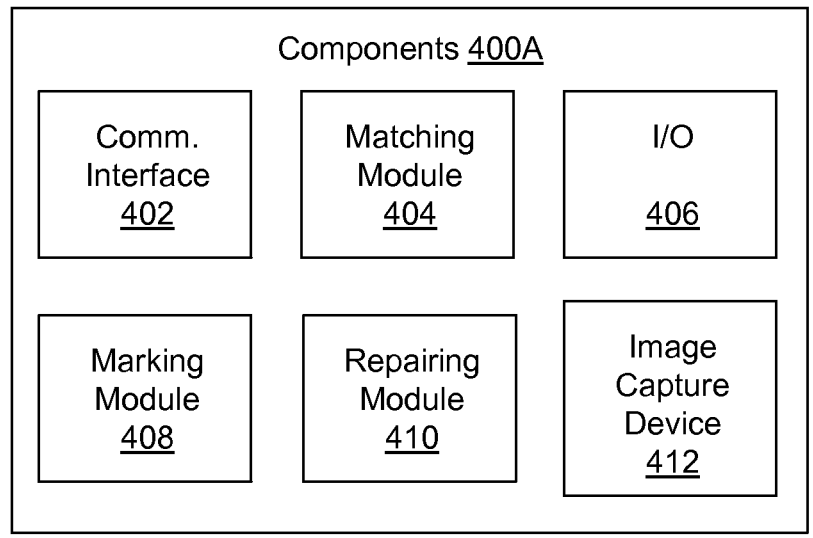
FIG. 4A is a block diagram of example components that may be included in client devices of FIG. 1.

FIG. 4A is a block diagram of example components 400A that may be included in the client devices 108, 110, 112 of FIG. 1, arranged in accordance with at least some embodiments described herein. The components 400A may correspond to the components 108A, 110A, 112A of FIG. 1. In the illustrated embodiment, the components 400A include a communication interface ("Comm. Interface" in FIG. 4A) 402 and a matching module 404.

The communication interface 402 may include, but is not limited to, a network interface controller (NIC), a network interface card, a network adapter, a LAN adapter, or the like or any combination thereof. The communication interface 402 may be configured to send repair parameters representing one or more repair operations applied to a marked image to generate a first repaired image to an entity. Optionally, the repair parameters and the first repaired image may have been previously received from a distributing entity, such as the image server 106 of FIG. 1, and locally stored by a corresponding client device 108, 110 or 112.

The communication interface 402 may be further configured to receive a second repaired image from the entity. The second repaired image may be generated by the entity applying the repair parameters received from the communication interface 402 to the marked image, and then sending the second repaired image to the communication interface 402.

In some embodiments, the communication interface 402 may be further configured to send the marked image to the entity prior to sending the repair parameters to the entity or receiving the second repaired image from the entity. In these and other embodiments, sending the marked image to the entity may include sending the marked image to a server, such as the image server 106, configured to provide the marked image to the entity.

The matching module 404 may be configured to authenticate the entity when the second repaired image received from the entity matches, or at least partially matches, the first repaired image. Specifically, the matching module 404 may compare the second repaired image to the first repaired image to determine whether they match. If the first and second repaired images match, the entity may be authenticated.

Optionally, the components 400A may further include one or more of: one or more input/output devices (I/O) 406, a marking module 408, a repairing module 410, and an image capture device 412.

In some embodiments, the I/O 406 includes an output device configured to display an image. The image displayed on the output device of the I/O 406 may include a template image from the database 120 of images 120A received from, e.g., the image server 106 through the communication interface 402. Alternately or additionally, the image displayed on the output device of the I/O 406 may be captured locally by the image capture device 412, which may include a digital camera or the like. Alternately or additionally, the image displayed on the output device of the I/O 406 may be received from some other source.

The I/O 406 may alternately or additionally include an input device configured to receive input effective to mark the image displayed on the output device of the I/O 406. The input device and the output device of the I/O 406 may collectively form a touchscreen display of the I/O 406.

The marking module 408 may be configured to mark the image according to the input received through the input device of the I/O 406 to generate the marked image.

The repairing module 410 may be configured to apply the one or more repair operations to the marked image to generate the first repaired image and the repair parameters representing the one or more repair operations. In some embodiments, the repairing module 410 is further configured in general to apply any of a multiple number of repair operations that include the one or more repair operations to marked images. In these and other embodiments, the input device of the I/O 406 may be configured to receive input effective to determine which of the multiple number of repair operations are applied to any given marked image.

Figure 4B:
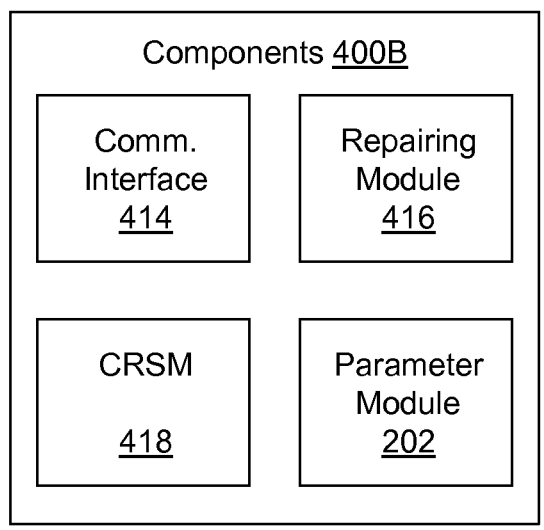
FIG. 4B is a block diagram of example components that may be included in an image server of FIG. 1.

FIG. 4B is a block diagram of example components 400B that may be included in the image server 106 of FIG. 1, arranged in accordance with at least some embodiments described herein. The components 400B may correspond to the components 106A of FIG. 1. In the illustrated embodiment, the components 400B include a communication interface ("Comm. Interface" in FIG. 4B) 414 and a repairing module 416.

The communication interface 414 may be configured to send a selected image from one or more stored images to a first entity that marks the selected image to create a marked image. The one or more stored images may be remotely stored in, e.g., the database 120 of images 120A. Alternately or additionally, the one or more stored images may be locally stored in a computer-readable storage medium ("CRSM" in FIG. 4B) 418 included in the components 400B. The communication interface 414 may be further configured to receive the marked image from the first entity. Optionally, the marked image received from the first entity may be stored remotely in the database 120 of images 120A, or locally in the computer-readable storage medium 418.

The repairing module 416 may be configured to apply any of a multiple number of repair operations to the marked image to generate a repaired image. Alternately or additionally, the repairing module 416 may be further configured to generate repair parameters representing one or more repair operations applied to the marked image to generate the repaired image.

In these and other embodiments, the communication interface 414 may be further configured to distribute the repaired image and the repair parameters to a second entity, where the second entity is configured to authenticate the first entity using the repair parameters as described herein. For instance, the second entity may send the repair parameters to the first entity and authenticate the first entity if the first entity returns a repaired image that matches the repaired image previously received by the second entity. Optionally, the communication interface 414 may be configured to distribute the repaired image and the repair parameters to the second entity securely, such as via HTTPs.

In some embodiments, the administrator 118 or other user preparing image data for authenticating an entity may be able to select and/or control the number of repair operations applied to the marked image by the repairing module 416. In these and other embodiments, the communication interface 414 may be further configured to receive an instruction from the first entity to terminate the application of repair operations to the marked image and the repairing module may be further configured to terminate the application of repair operations to the marked image consistent with the instruction.

Figure 5:
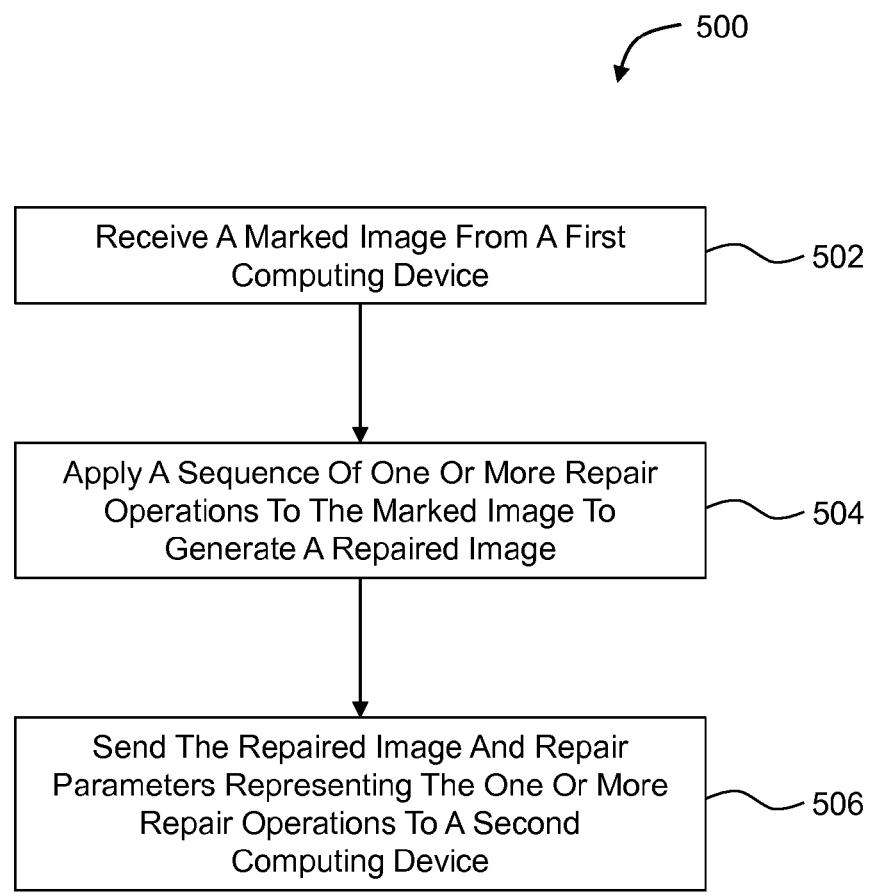
FIG. 5 shows an example flow diagram of a method of preparing image data for authenticating an entity.

FIG. 5 shows an example flow diagram of a method 500 of preparing image data for authenticating an entity, arranged in accordance with at least some embodiments described herein. The method 500 may be performed in whole or in part by the image server 106 of FIG. 1. The method 500 includes various operations, functions or actions as illustrated by one or more of blocks 502, 504 and/or 506. The method 500 may begin at block 502.

In block 502, a marked image is received from a first computing device. For instance, the image server 106 may receive a marked image from the administrator's 118 client device 112. Alternately or additionally, a copy of the marked image may be retained at the administrator's 118 client device 112 and/or provided to the web server 104 or any other first entity for authenticating a second entity that has access to a corresponding repaired image and repair parameters as described herein. Block 502 may be followed by block 504.

In block 504, a sequence of one or more repair operations is applied to the marked image to generate a repaired image. Applying a sequence of one or more repair operations to a marked image to generate a repaired image may include successively applying the repair operations to an immediately preceding image, such as the original image 302, and the repaired images $B_1, \ldots, B_{x-1}$ as described above with respect to FIG. 3. In these and other embodiments, the method 500 may further include generating a repair parameter representing each repair operation as described above with respect to FIG. 3.

The one or more repair operations applied to the marked image may include, but are not limited to, enlarging an image area by a percentage $n_1$, reducing an image area by a percentage $n_2$, removing a particular color from an image area by a percentage $n_3$, or reducing block noise in an image area by a percentage $n_4$. The one or more repair operations may alternately or additionally include at least one of: image thresholding, color temperature conversion, color space conversion, edge enhancement processing, applying a fast Fourier Transform (FFT) filter, applying a Kalman filter, autoregressive (AR) processing, line or line segment detection, curve extraction, or affine transformation.

Returning to FIG. 5, block 504 may be followed by block 506. In block 506, the repaired image and repair parameters representing the one or more repair operations are sent to a second computing device. For instance, the image server 106 may send the repaired image and repair parameters representing the one or more repair operations to the registered user's 114 client device 108 or to the interested user's 116 client device 110. In these and other embodiments, the repaired image and the repair parameters may be sent securely to the second computing device.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, the method 500 may further include receiving an instruction from the first computing device to terminate the sequence of one or more repair operations applied to the marked image. In these and other embodiments, the administrator 118 may be connected through the client device 112 to the image server 106 during the image repairing process to select the particular repair operations that are applied to the marked image and/or to control the number of repair operations that are applied to the marked image. Alternately or additionally, the repair operations applied to the marked image can proceed and/or be controlled automatically by the image server 106 or other computing device without human intervention.

Figure 6:
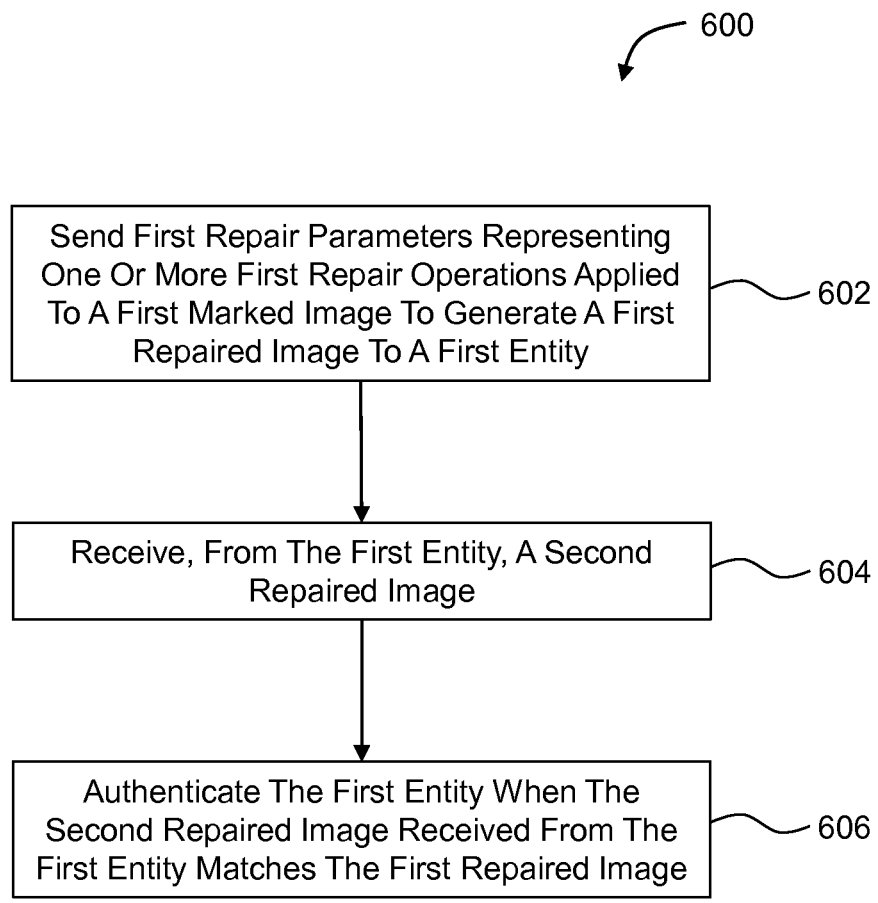
FIG. 6 shows an example flow diagram of a method of authenticating.

FIG. 6 shows an example flow diagram of a method 600 of authenticating, arranged in accordance with at least some embodiments described herein. The method 600 refers to both first and second entities that are involved in an authentication process, and may be performed in whole or in part by the second entity, such as any of the client devices 108, 110, 112 of FIG. 1 in connection with the associated user 114, 116, 118. In some embodiments, the method 600 may be performed after an authentication system has been created by distributing a marked image to a first computing device or entity and a corresponding repaired image and repair parameters to a second computing device or entity, a specific example of which has been described with respect to the method 500 of FIG. 5. The method 600 includes various operations, functions or actions as illustrated by one or more of blocks 602, 604 and/or 606. The method 600 may begin at block 602.

In block 602, first repair parameters representing one or more first repair operations applied to a first marked image to generate a first repaired image are sent to a first entity. For instance, the first repair parameters may be sent from the client device 108 or 110 to, e.g., the web server 104 or another first entity for authentication.

Alternately or additionally, the first repair parameters may include a series of numbers separated into one or more sets where each set includes a code indicating a particular repair operation. Each set may alternately or additionally include numbers that designate an area of the marked image to which the repair operation is applied and/or an amount, such as a percentage, associated with the repair operation. In these and other embodiments, the series of numbers may be encrypted when sent to the first entity.

Returning to FIG. 6, block 602 may be followed by block 604.

In block 604, a second repaired image is received from the first entity. In these and other embodiments, the first entity may have access to the first marked image and may generate the second repaired image by applying the one or more first repair operations to the marked image after receiving the first repair parameters. Block 604 may be followed by block 606.

In block 606, the first entity is authenticated when the second repaired image received from the first entity matches the first repaired image.

The method 600 may be performed by a second entity, such as the interested user 114 through the client device 108. As described above, the interested user 114, or second entity, may be interested in services administered by the first entity, which administered services may include services and/or content. The interested user 114, or second entity, may not be a registered user, and may be able to access a first set of the services administered by the first entity using the first repair parameters without registering. Thus, the first repair parameters may be assigned to unregistered users in some embodiments.

Alternately or additionally, the method 600 may further include registering the interested user 114, or the second entity, to gain access to a second set of services administered by the first entity. The second set of services may include the first set of services and additional services. After being registered, the second entity may become a registered user, such as the registered user 116 of FIG. 1.

Registering the second entity may include marking, at the second entity, an unmarked image to generate a second marked image. A sequence of one or more second repair operations may be applied to the second marked image to generate a third repaired image. The third repaired image and repair parameters representing the one or more second repair operations may be stored at the second entity. The second marked image may be provided to the first entity.

In these and other embodiments, marking the unmarked image to generate a second marked image may include marking the unmarked image according to input received through a touchscreen on which the unmarked image is displayed.

Alternately or additionally, the method 600 may further include, for subsequent access of the second set of services by the second entity, sending the second repair parameters to the first entity. A fourth repaired image may be received from the first entity. The first entity may be authenticated when the fourth repaired image received from the first entity matches the locally stored third repaired image.

Figure 7:
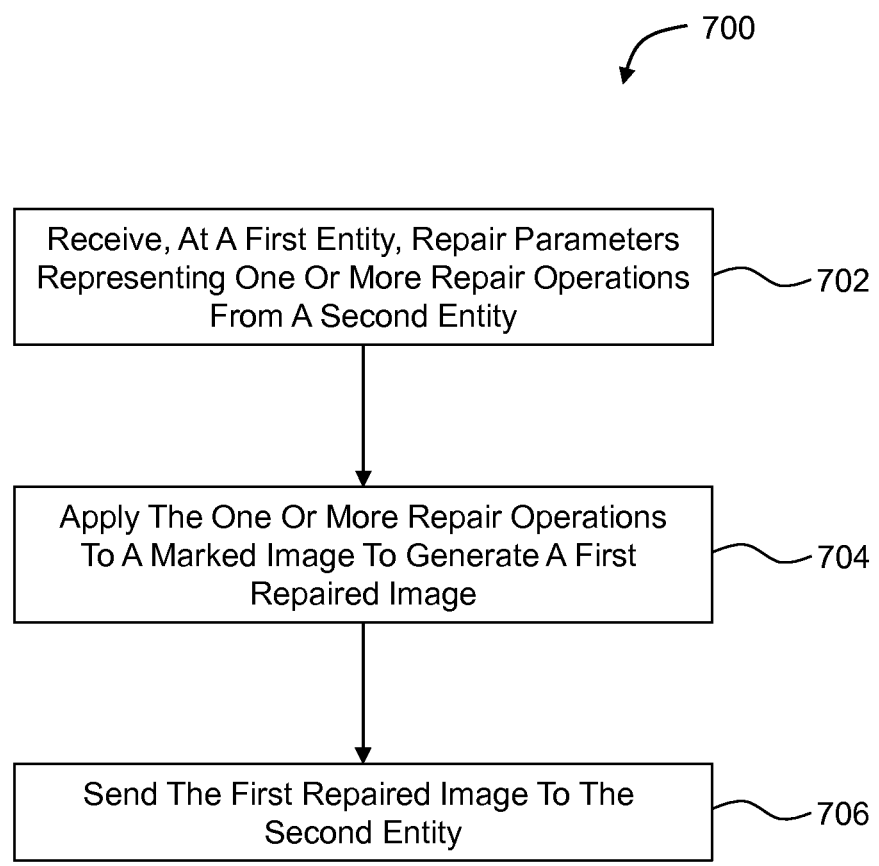
FIG. 7 shows an example flow diagram of another method of authenticating.

FIG. 7 shows an example flow diagram of another method 700 of authenticating, arranged in accordance with at least some embodiments described herein. The method 700 refers to both first and second entities that are involved in an authentication process, and may be performed in whole or in part by the first entity. The first entity may be the web server 104 or the client device 112 associated with the administrator 118 of FIG. 1, for instance. In some embodiments, similar to the method 600 of FIG. 6, the method 700 may be performed after an authentication system has been created by distributing a marked image to a first computing device or entity and a corresponding repaired image and repair parameters to a second computing device or entity, a specific example of which has been described with respect to the method 500 of FIG. 5. The method 700 includes various operations, functions or actions as illustrated by one or more of blocks 702, 704 and/or 706. The method 700 may begin at block 702.

In block 702, repair parameters representing one or more repair operations are received at a first entity from a second entity. For instance, the repair parameters may be received at the web server 104 from the client device 110 associated with the registered user 116. Alternatively, the repair parameters may be received at the web server 104 from the client device 108 associated with the interested user 114, in which case the repair parameters may include repair parameters assigned to unregistered users. Block 702 may be followed by block 704.

In block 704, the one or more repair operations are applied to a marked image to generate a first repaired image. Block 704 may be followed by block 706.

In block 706, the first repaired image is sent to the second entity. The first entity may be authenticated when the second entity determines that the first repaired image matches a second repaired image accessible to the second entity.

Although not depicted in FIG. 7, the method 700 may additionally include downloading an unmarked image. For instance, the client device 112 of the administrator 118, or the web server 104, may download an unmarked image from the database 120 of images 120A through the image server 106. Input may be received that is effective to mark the unmarked image. The unmarked image may be marked to create a marked image according to the input.

In these and other embodiments, the marked image may be sent to a server, such as the image server 106, that is configured to repair marked images. Input may be received that is effective to determine an extent to which the marked image is repaired by the application of repair operations to the marked image by the server. The applied repair operations may include the one or more repair operations represented by the repair parameters. The server may be configured to generate the second repaired image by applying the one or more repair operations to the marked image. The server may also be configured to generate the repair parameters representing the one or more repair operations applied by the server to the marked image. The server may also be configured to provide the second repaired image and the repair parameters to the second entity.

Alternately or additionally, the first entity may administer services and the second entity can access a first set of the services using the repair parameters without being registered with the first entity. The marked image may be a first marked image and the repair parameters may be first repair parameters. The second entity may register with the first entity to gain access to a second set of services administered by the first entity. The second set of services may include the first set of services and additional services. In these and other embodiments, the method 700 may further include receiving a second marked image. In association with the registration of the second entity with the first entity, the second entity may locally store a third repaired image and second repair parameters representing one or more second repair operations applied to the second marked image to generate the third repaired image.

Alternately or additionally, the method 700 may further include, for subsequent access of the second set of services by the second entity, receiving the second repair parameters from the second entity. The method 700 may also include applying one or more second repair operations to the second marked image to generate a fourth repaired image. The method 700 may also include sending the fourth repaired image to the second entity. The first entity may be authenticated when the second entity determines that the fourth repaired image received from the first entity matches the locally stored third repaired image. The method 700 may also include providing access to the second set of services to the second entity.

Some of the embodiments described herein can be applied to examples other than those described above. For instance, in the case of a website full of numerals, drawings, etc. and directed to a large number of unidentified (e.g., unregistered) users, different portions may be cited by different users. Thus, accessing users may create marks and browse needed sentences or data, with repair parameters distributed via a separate channel. As such, it may be possible to re-provide information to each user about how the user focuses on the content of the website without changing a corresponding login interface for unspecific users. Alternately or additionally, embodiments described herein can be applied to digesting an electronic book or the like.

Figure 8:
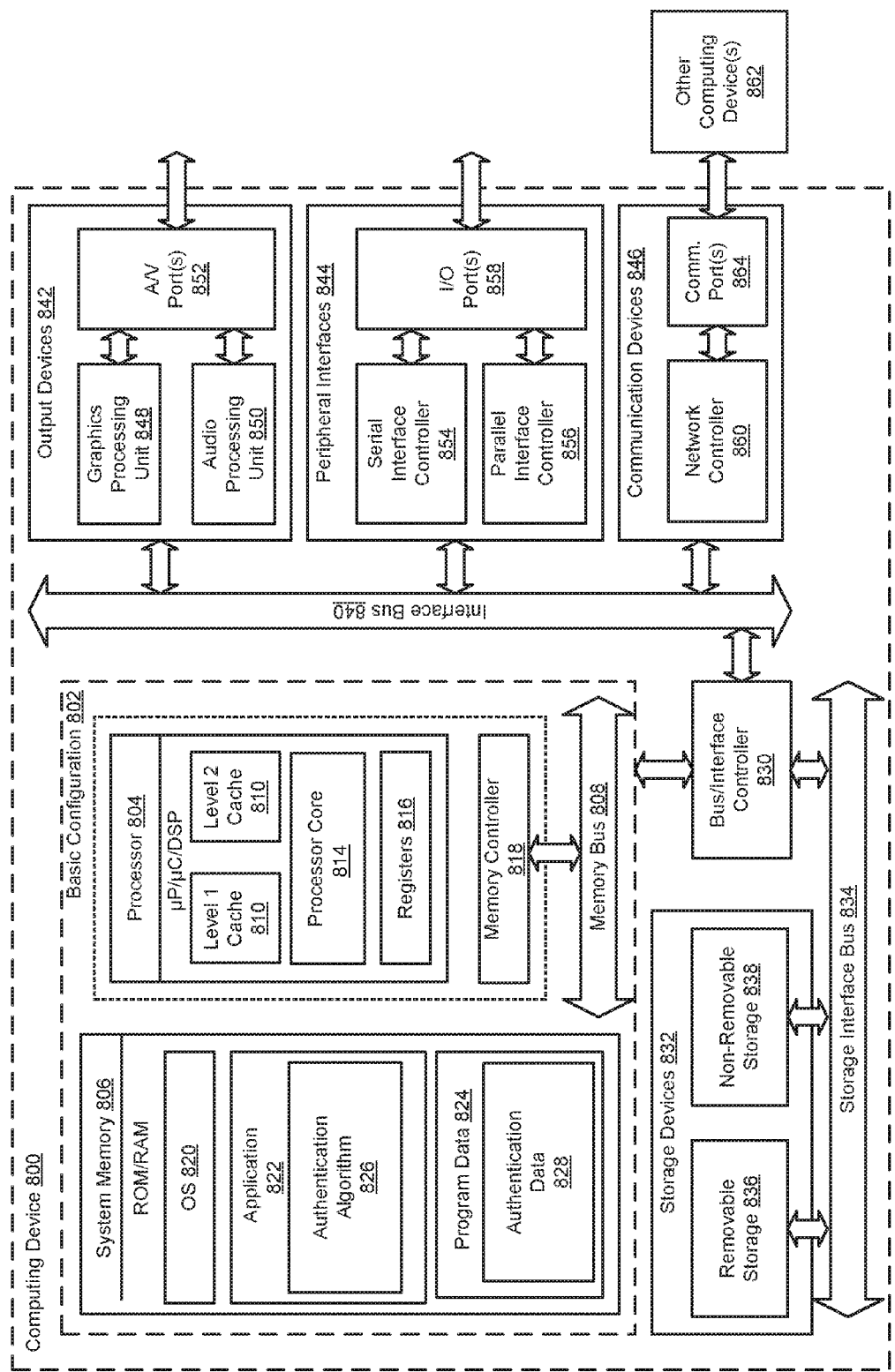
FIG. 8 is a block diagram illustrating an example computing device that is arranged for implementing authentication, all arranged in accordance with at least some embodiments described herein.

FIG. 8 is a block diagram illustrating an example computing device 800 that is arranged for implementing authentication, arranged in accordance with at least some embodiments described herein. The computing device 800 may correspond to, for instance, any one of the web server 104, image server 106, or client devices 108, 110, 112. In a very basic configuration 802, computing device 800 typically includes one or more processors 804 and a system memory 806. A memory bus 808 may be used for communicating between processor 804 and system memory 806.

Depending on the desired configuration, processor 804 may be of any type including but not limited to a microprocessor (µP), a microcontroller (µC), a digital signal processor (DSP), or any combination thereof. Processor 804 may include one more levels of caching, such as a level one cache 810 and a level two cache 812, a processor core 814, and registers 816. An example processor core 814 may include an arithmetic logic unit (ALU), a floating point unit (FPU), a digital signal processing core (DSP Core), or any combination thereof. An example memory controller 818 may also be used with processor 804, or in some implementations memory controller 818 may be an internal part of processor 804.

Depending on the desired configuration, system memory 806 may be of any type including but not limited to volatile memory (such as RAM), non-volatile memory (such as ROM, flash memory, etc.) or any combination thereof. System memory 806 may include an operating system 820, one or more applications 822, and program data 824. Application 822 may include an authentication algorithm 826 that is arranged to perform the functions as described herein including those described with respect to the process 500, 600, and/or 700 of FIGS. 5, 6, and/or 7. Program data 824 may include authentication data 828 such as a marked image, a repaired image, repair parameters, or the like that may be useful for configuring the authentication algorithm 826 as is described herein. In some embodiments, application 822 may be arranged to operate with program data 824 on operating system 820 such that authentication by image inpainting/marking may be provided as described herein. This described basic configuration 802 is illustrated in FIG. 8 by those components within the inner dashed line.

Computing device 800 may have additional features or functionality, and additional interfaces to facilitate communications between basic configuration 802 and any required devices and interfaces. For example, a bus/interface controller 830 may be used to facilitate communications between basic configuration 802 and one or more data storage devices 832 via a storage interface bus 834. Data storage devices 832 may be removable storage devices 836, non-removable storage devices 838, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 806, removable storage devices 836 and non-removable storage devices 838 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 800. Any such computer storage media may be part of computing device 800.

Computing device 800 may also include an interface bus 840 for facilitating communication from various interface devices (e.g., output devices 842, peripheral interfaces 844, and communication devices 846) to basic configuration 802 via bus/interface controller 830. Example output devices 842 include a graphics processing unit 848 and an audio processing unit 850, which may be configured to communicate to various external devices such as a display or speakers via one or more A/V ports 852. Example peripheral interfaces 844 include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 846 includes a network controller 860, which may be arranged to facilitate communications with one or more other computing devices 862 over a network communication link via one or more communication ports 864.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 may also be implemented as a personal computer including both laptop computer and non-laptop computer configurations.

The present disclosure is not to be limited in terms of the particular embodiments described herein, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method to authenticate a device, the method comprising:
   receiving a marked digital image over a digital network at a device;
   receiving repair parameters over the digital network at the device, the repair parameters configured to adjust a visual depiction of the marked digital image;
   applying, by the device through a processor, the repair parameters to the marked digital image to digitally manipulate the marked digital image to generate a repaired digital image;
   sending the repaired digital image over the digital network to an authenticating device; and
   receiving, at the device, an authentication notification from the authenticating device regarding the authenticating device acknowledging an identity of the device, a status of the authentication notification based on a comparison by the authenticating device of the repaired digital image with a comparison digital image generated using the repair parameters and the marked digital image.

2. The method of claim 1, wherein the status of the authentication notification is authentication when the repaired digital image at least partially matches the comparison digital image.

3. The method of claim 1, wherein the status of the authentication notification is non-authentication when the repaired digital image does not at least partially match the comparison digital image.

4. The method of claim 1, wherein the marked digital image is received over the digital network from the authentication device.

5. The method of claim 1, wherein the repair parameters are received over the digital network from the authentication device.

6. The method of claim 1, wherein the authenticating device is a client device and the method is performed by a web server.

7. The method of claim 1, wherein the marked digital image is a first marked digital image, the method further comprising registering the authenticating device in response to receiving a second marked digital image from the authenticating device.

8. The method of claim 7, wherein the repair parameters are first repair parameters, the repaired digital image is a first repaired digital image, and the comparison digital image is a first comparison digital image, the method further comprising:
   receiving second repair parameters over the digital network from the authenticating device;
   applying the second repair parameters to the second marked digital image to generate a second repaired digital image;
   sending the second repaired digital image over the digital network to the authenticating device; and
   providing services based on receiving a second authentication notification from the authenticating device that a second comparison digital image, generated using the second repair parameters and the second marked digital image, at least partially matches the second repaired digital image.

9. A non-transitory computer-readable medium that when executed by a processor cause a device to perform operations, the operations comprising:
   receiving a marked digital image over a digital network at a device;
   receiving repair parameters over the digital network at the device, the repair parameters configured to adjust a visual depiction of the marked digital image;
   applying, by the device, the repair parameters to the marked digital image to digitally manipulate the marked digital image to generate a repaired digital image;
   sending the repaired digital image over the digital network to an authenticating device; and
   receiving, at the device, an authentication notification from the authenticating device regarding the authenticating device acknowledging an identity of the device, a status of the authentication notification based on a comparison by the authenticating device of the repaired digital image with a comparison digital image generated using the repair parameters and the marked digital image.

10. The non-transitory computer-readable medium of claim 9, wherein the status of the authentication notification is authentication when the repaired digital image at least partially matches the comparison digital image.

11. The non-transitory computer-readable medium of claim 9, wherein the status of the authentication notification is non-authentication when the repaired digital image does not at least partially match the comparison digital image.

12. The non-transitory computer-readable medium of claim 9, wherein the marked digital image is received over the digital network from the authentication device.

13. The non-transitory computer-readable medium of claim 9, wherein the repair parameters are received over the digital network from the authentication device.

14. The non-transitory computer-readable medium of claim 9, wherein the authenticating device is a client device and the operations are performed by a web server.

15. The non-transitory computer-readable medium of claim 9, wherein the marked digital image is a first marked digital image, the operations further comprising registering the authenticating device in response to receiving a second marked digital image from the authenticating device.

16. The non-transitory computer-readable medium of claim 15, wherein the repair parameters are first repair parameters, the repaired digital image is a first repaired digital image, and the comparison digital image is a first comparison digital image, the operations further comprising:
- receiving second repair parameters over the digital network from the authenticating device;
- applying the second repair parameters to the second marked digital image to generate a second repaired digital image;
- sending the second repaired digital image over the digital network to the authenticating device; and
- providing services based on receiving a second authentication notification from the authenticating device that a second comparison digital image, generated using the second repair parameters and the second marked digital image, at least partially matches the second repaired digital image.

17. A method to provide services, the method comprising:
- providing a first interface configured to receive a first input from an authenticating device;
- receiving, at a device, the first input from the authenticating device;
- in response to receiving the first input, requesting, from the authenticating device, repair parameters configured to adjust a visual depiction of a marked digital image;
- in response to no repair parameters being received at the device from the authenticating device, providing first digital content to the device; and
- in response to repair parameters being received at the device from the authenticating device:
  - applying, by the device through a processor, the received repair parameters to the marked digital image to digitally manipulate the marked digital image to generate a repaired digital image;
  - sending the repaired digital image to the authenticating device; and
  - in response to being authenticated by the authenticating device based on the sent repaired digital image; providing second digital content from the device to the authenticating device that is different than the first digital content.

18. The method of claim 17, further comprising in response to receiving the first input, providing a second interface with the marked digital image.

19. The method of claim 17, wherein the first digital content is determined based on the repair parameters received from the authenticating device.

20. The method of claim 17, wherein when repair parameters are received from the authenticating device, the method further comprises comparing the received repair parameters to total repair parameters to determine a ratio between the received repair parameters and the total repair parameters, wherein an amount of the second digital content provided to the device is based on the ratio between the received repair parameters and the total repair parameters.

21. The method of claim 20, wherein in response to the received repair parameters matching the total repair parameters, providing a first amount of the second digital content to the authenticating device.

22. The method of claim 21, wherein in response to the received repair parameters matching a portion of the total repair parameters, providing a second amount of the second digital content to the authenticating device, the second amount being less than the first amount.

23. A method, comprising:
- receiving, at an authenticating device, a first repaired digital image and first repair parameters, the first repaired digital image being generated by applying through a processor the first repair parameters to a first marked digital image to digitally manipulate the first marked digital image;
- authenticating a device by the authenticating device, including:
  - sending the first repair parameters to the device;
  - receiving a second repaired digital image from the device;
  - comparing the first repaired digital image to the second repaired digital image; and
  - in response to the second repaired digital image at least partially matching the first repaired digital image, authenticating the device; and
- in response to authenticating the device, providing digital content from the device to the authenticating device.

24. The method of claim 23, further comprising:
registering with the device, including:
- marking an digital image to generate a second marked digital image;
- sending the second marked digital image to the device;
- generating second repair parameters; and
- applying the second repair parameters to the second marked digital image to generate a third repaired digital image.

25. The method of claim 24, further comprising:
subsequent to registering with the device:
- sending the second repair parameters to the device;
- receiving a fourth repaired digital image from the device;
- comparing the third repaired digital image to the fourth repaired digital image; and
- in response to the fourth repaired digital image at least partially matching the third repaired digital image, authenticating the device.

* * * * *